United States Patent [19]

Oshima

[11] Patent Number: 5,257,096
[45] Date of Patent: Oct. 26, 1993

[54] MONITOR TELEVISION RECEIVER

[75] Inventor: Junichi Oshima, Kanagawa, Japan

[73] Assignee: Sony Corporation, Tokyo, Japan

[21] Appl. No.: 728,278

[22] Filed: Jul. 11, 1991

[30] Foreign Application Priority Data

Jul. 13, 1990 [JP] Japan .................................. 2-184227

[51] Int. Cl.$^5$ ............................................. H04N 17/02
[52] U.S. Cl. ........................................ 358/10; 358/56
[58] Field of Search ...................... 358/10, 29, 56, 161

[56] References Cited

U.S. PATENT DOCUMENTS

| 4,706,108 | 11/1987 | Kumagai et al. | 358/10 |
| 4,742,387 | 5/1988 | Oshima | 358/161 |
| 4,746,970 | 5/1988 | Hosokawa et al. | 358/56 |
| 4,814,858 | 3/1989 | Mochizuki et al. | 358/10 |
| 5,049,791 | 9/1991 | Kawakami | 358/10 |

Primary Examiner—Victor R. Kostak
Assistant Examiner—John W. Miller
Attorney, Agent, or Firm—Lewis H. Eslinger; Jay H. Maioli

[57] ABSTRACT

A monitor television receiver for displaying or supplying a color video output has a circuit for measuring the cathode currents of electron guns for three primary colors in a cathode-ray tube. A memory stores coefficients to form functional expressions relative to the cathode currents and the luminance and also stores chromaticity points of three-color fluorescers. A input receives color temperature data and luminance data from external sources, and an arithmetic unit calculates the luminances of the three-color fluorescers corresponding to the input luminance data and color temperature data and also calculates the cathode currents of the electron guns corresponding to the color temperature data and the luminance data from the input. A CRT drive circuit is controlled in such a manner that the measured cathode currents are rendered coincident with the cathode currents calculated by the arithmetic unit. Automatic white balance control can thus be performed without the necessity of using an expensive optical sensor or the like.

2 Claims, 6 Drawing Sheets

FIG. I

MONITOR TELEVISION RECEIVER

BACKGROUND OF THE INVENTION

1. Field of the Invention

The present invention relates to a monitor television receiver for displaying a color video output.

2. Description of the Prior Art

In color monitor television receivers for business use particularly in broadcasting stations and so forth, it is necessary to control the current ratio (known generally as white balance) among electron guns of three primary colors in a cathode-ray tube so that a preset white color temperature can be maintained constant regardless of whether a video image is light (at a high luminance) or dark (at a low luminance).

Such white balance control is executed by adjusting a bias in each of drive circuits for three primary colors of red (R), green (G) and blue (B) when the R, G and B currents are in a non-controlled state as shown in FIG. 5A. First the biases in the R, G, B drive circuits are controlled to attain a coincidence of the low luminance levels as shown in FIG. 5B, and then the gains in the individual drive circuits are controlled to attain a coincidence of the drive level-to-luminance characteristic curves of the three primary colors as shown in FIG. 5C, thereby completing the adjustment.

However, any change caused in the bias by the control thereof affects the high luminance level, and also any change caused in the gain by the control thereof affects the low luminance level. Therefore, at the time of practical white balance control, it is necessary to repeat both the bias control and the gain control over again to gradually achieve proper bias and gain values, hence requiring an extremely complicated operation.

For the purpose of automating such operation, there has been developed an automatic setup system which measures the output light of a monitor television receiver by means of an optical sensor attached to the screen face of a cathode-ray tube (CRT), and controls a CRT drive circuit in such a manner that the color temperature of the measured output light becomes equal to a predetermined color temperature stored previously in a memory for example. The above development releases an operator from the complicated manual operation to perform the intricate procedure.

However, for execution of the white balance control according to such automatic setup system, an optical sensor needs to be attached to the CRT screen face. Therefore, when the monitor television receiver is installed at a high position or behind a control console for example in a monitor room of a broadcasting station, some difficulties may be occasionally existent in attaching the optical sensor to consequently raise a problem that the white balance control is not executable with facility. Furthermore, for achieving a substantially complete white balance on the basis of the actual value measured by the optical sensor, it is necessary that the optical sensor itself be excellent in spectral characteristic to eventually render the system extremely expensive.

In addition, it is impossible to completely eliminate the harmful influence of external light since the monitor output is measured on the CRT screen face, and an adjustment in any light place induces an increase in the error.

Besides the above, an accurate measurement of the color temperature of the monitor output light is impossible unless an expensive spectrum analyzer is employed and, even if a desired color temperature is specified by numerical values such as white of standard light D65 or white of coordinates (x, y)=(0.313, 0.319) on a CIE chromaticity diagram, it is difficult, depending on the performance of the optical sensor in general use, to attain control of the monitor output light in conformity with the numerical values or to control the white balance automatically with such values.

Due to the reason similar to the above, it is impossible to exactly measure the color temperature of the monitor output light after controlling the color temperature to a certain value or after controlling the white balance. Particularly in a multi-CRT display system or the like which displays one video image on a plurality of CRTs in a monitor room or an editing room of a broadcasting station, where a plurality of monitor television receivers need to be maintained in the same state under control, the color temperature cannot be specified by an absolute numerical value in each of the monitor television receivers to eventually raise a problem of extreme intricacy in the control manipulation.

OBJECT AND SUMMARY OF THE INVENTION

It is an object of the present invention to provide an improved monitor television receiver which is capable of outputting from a cathode-ray tube (CRT) a satisfactory video image of a desired color temperature specified by a numerical value while performing automatic control of a white balance without the necessity of any optical sensor, and further capable of outputting the measured color temperature of the CRT output video image as required data.

According to one aspect of the present invention, there is provided a monitor television receiver comprising a means for measuring the cathode currents of electron guns for three primary colors in a cathode-ray tube; a memory means for storing coefficients to form a functional expression relative to the cathode currents and the luminances in the monitor television receiver; an input means for receiving arbitrary color temperature data and luminance data from external sources; an arithmetic means having relational expressions with regard to the luminance data, the color temperature data, the chromaticity points of the three-color fluorescers, and the coefficients to form a functional expression relative to the cathode currents and the luminance levels, hence capable of calculating desired cathode current values from the input color temperature data and luminance data; and a control means for controlling a CRT drive circuit in such a manner as to render the measured cathode currents coincident with the calculated cathode currents obtained from the arithmetic means.

And according to another aspect of the present invention, there is provided a monitor television receiver further comprising a means for outputting the color temperature data of the CRT output light calculate from the measured cathode currents by the aforementioned arithmetic means.

The above and other features and advantages of the present invention will become apparent from the following description which will be given with reference to the illustrative accompanying drawings.

DESCRIPTION OF THE PREFERRED EMBODIMENT

Hereinafter the present invention will be described in detail with reference to an exemplary embodiment shown in the accompanying drawings.

Figure 6:
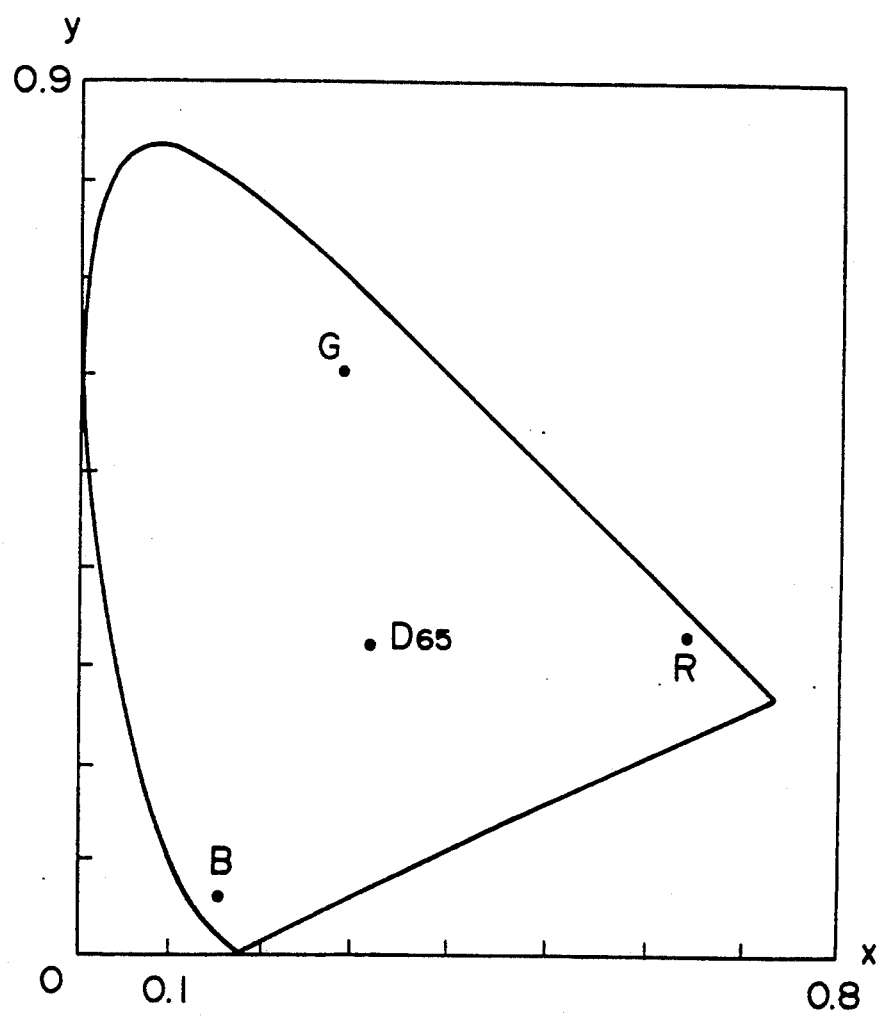
FIG. 6 illustrates the chromaticity points of three-color fluorescers on a CIE chromaticity diagram and a centroid of such points.

Suppose now that, in an exemplary case, R, G and B fluorescers of a cathode-ray tube (CRT) in a monitor television receiver have the following coordinates (x, y) on a CIE chromaticity diagram shown in FIG. 6.

R fluorescer coordinates: $(x_r, y_r) = (0.64, 0.33)$
G fluorescer coordinates: $(x_g, y_g) = (0.29, 0.60)$
B fluorescer coordinates: $(x_b, y_b) = (0.15, 0.06)$ In this case, a reference white at D65 represented by coordinates $(x_w, y_w) = (0.313, 0.319)$ can be obtained by controlling the luminance ratio of the R, G, B fluorescers and calculating the luminances $Y_R$, $Y_G$, $Y_B$ of the individual fluorescers in such a manner that the centroid thereof corresponds to (0.313, 0.319). (On the CIE chromaticity diagram of FIG. 6, the luminance level is represented by a Z-axis perpendicular to the drawing paper face.)

Generally the relationship between the cathode current $I_K$ and the luminance Y in the CRT is expressed as $$Y = K \times (I_K)^\gamma \quad (1)$$

(where $\gamma$ and K are coefficients)

Therefore, if the values of the coefficients $\gamma$, K in Eq. (1) and the values at the chromaticity points of the R, G, B fluorescers are held in the monitor television receiver, it becomes possible to calculate the cathode currents required to obtain the CRT output at a desired color temperature.

In an exemplary case of obtaining a reference white at D65 where the luminance is $Y_W$, the respective luminances $Y_R$, $Y_G$, $Y_B$ of the individual R, G, B fluorescers can be calculated from the luminance ratio of the R, G, B fluorescers based on both the values of the chromaticity points and the coordinate values of D65 and also from that the sum of the luminances of the individual fluorescers is $Y_W$. By substituting each of such luminances $Y_R$, $Y_G$, $Y_B$ for the luminance Y in Eq. (1), the cathode currents $I_{K(R)}$, $I_{K(G)}$, $I_{K(B)}$ in the individual R, G, B electron guns can be calculated.

Therefore the gain control is executed in the CRT drive circuit in a manner that the calculated cathode currents are obtained in the white at D65 with a high luminance $Y_{W(H)}$, and the bias control is executed in the CRT drive circuit in a manner that the calculated cathode currents are obtained in the white at D65 with a low luminance $Y_{W(L)}$, whereby the white balance control at D65 can also be achieved automatically.

And upon measurements of the cathode currents $I_{K(R)}$, $I_{K(G)}$, $I_{K(B)}$ in the individual R, G, B electron guns, the color temperature of the CRT output can be calculated by an inverse operation.

Figure 1:
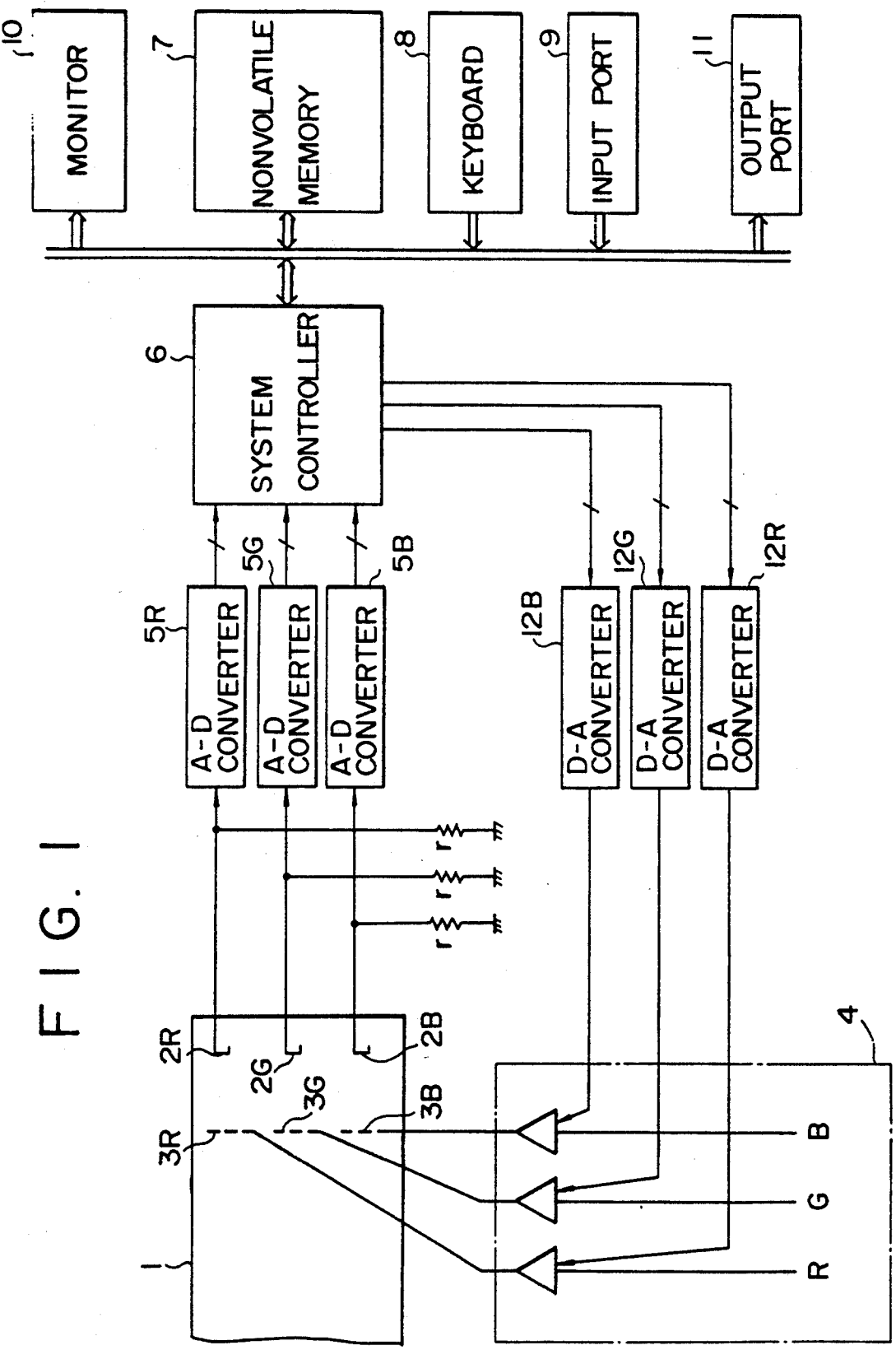
FIG. 1 is a block diagram of principal components in a monitor television receiver embodying the present invention.

FIG. 1 shows principal components in an embodiment of the monitor television receiver according to the present invention. In this diagram, there are included a CRT 1; cathodes 2R, 2G, 2B for emitting electron beams which are to be irradiated to fluorescers for three primary colors of red (R), green (G) and blue (B); first grid electrodes 3R, 3G, 3B; and a CRT drive circuit 4 for applying R, G, B driving voltages to the first grid electrodes 3R, 3G, 3B respectively so as to control the electron beams (cathode currents) emitted from the electron guns.

Also shown are analog-to-digital (A-D) converters 5R, 5G, 5B for digitizing the terminal voltages of resistors r for detecting the currents in the cathodes 2R, 2G, 2B.

Denoted by reference numeral 6 is a system controller which consists of a microcomputer with a CPU (central processing unit), a ROM (read only memory), a RAM (random access memory) and an interface. The operation of the system controller 6 will be described later.

Reference numeral 7 denotes a nonvolatile memory for storing coefficients to form functional expressions between the cathode currents and the luminances in the monitor television receiver, i.e., the values of $\gamma$ and K ($\gamma_R$, $\gamma_G$, $\gamma_B$, $K_R$, $K_G$, $K_B$) in Eq. 1, and the numerical values of the chromaticity points $(x_r, y_r)$, $(x_g, y_g)$, $(x_b, y_b)$ of the individual fluorescers. Also stored in the memory 7 are the cathode current values $I_{K(R)}$, $I_{K(G)}$, $I_{K(B)}$ representing a given reference white (e.g., standard light D65 with a luminance 100nit). Such data are previously measured or calculated in a factory or the like upon completion of each product and are stored in the nonvolatile memory 7.

The coefficient $\gamma$ is substantially fixed in value depending on the kind of the CRT, but the value of the coefficient K has a relatively great individual variation. The coefficients $K_R$, $K_G$, $K_B$ can be measured by first obtaining the standard white accurately from the CRT by means of a spectrum analyzer or the like, then measuring the cathode currents $I_{K(R)}$, $I_{K(G)}$, $I_{K(B)}$ at such instant, and inversely calculating the desired values from Eq. (1). Occasionally the coefficient K is varied by the influence of the terrestrial magnetism and the place of installation, so that correction of the coefficient K may be needed after installation of the monitor television receiver by a user. However, such correction can be easily executed in accordance with the reference cathode currents representative of the reference white at the time of shipment from the factory as mentioned above.

Also shown are a keyboard 8 and an input port 9 by which a user can input desired color temperature data and luminance data directly or from an external apparatus.

Denoted by 10 is a control monitor for displaying the input data fed from the keyboard 8 or the input port 9, or displaying the output data. An output port 11 serves to transfer various predetermined data, control signals and so forth therethrough to external apparatus.

Further shown are digital-to-analog (D-A) converters 12R, 12G, 12B which convert drive control signals obtained by the operation of an undermentioned system controller 6 into analog signals for the bias and gain adjustment and then supply the converted signals to the CRT drive circuit 4.

In the embodiment so constituted as described, the CRT output can be automatically controlled to a desired color temperature. The operation of the system controller 6 is performed in conformity to the procedure shown in a flow chart of FIG. 2.

When color temperature data $(x_w, y_w)$ and luminance data $Y_w$ are inputted by the manipulation of a user from the keyboard 8 or an external apparatus via the input port 9 to the system controller 6 [F100], the luminances $Y_R$, $Y_G$, $Y_B$ of the R, G, B fluorescers are calculated for displaying the specified data [F101].

In case the color temperature is specified by a numerical value such as D32, first the numerical value is converted into chromaticity coordinates $(x_w, y_w)$.

The luminances $Y_R$, $Y_G$, $Y_B$ are calculated in accordance with a processing program prepared in the system controller 6 to represent the relation among the chromaticities of the three-color fluorescers, the white chromaticity, and the luminance ratio of the fluorescers.

In the monitor television receiver, the non-volatile memory 7 stores therein a red chromaticity $(x_r, y_r)$, a green chromaticity $(x_g, y_g)$, a blue chromaticity $(x_b, y_b)$, three stimulus values $X_R$, $Y_R$, $Z_R$; $X_G$, $Y_G$, $Z_G$; $X_B$, $Y_B$, $Z_B$ by the fluorescers, and three stimulus values $X_W$, $Y_W$, $Z_W$ at the input color temperature $(x_w, y_w)$. Then, there exist the following relations among the desired values $Y_R$, $Y_G$, $Y_B$ to be calculated.

$$X_R = \frac{x_r}{y_r} \cdot Y_R \quad (2)$$

$$X_G = \frac{x_g}{y_g} \cdot Y_G \quad (3)$$

$$X_B = \frac{x_b}{y_b} \cdot Y_B \quad (4)$$

$$Z_R = \frac{1 - x_r - y_r}{y_r} \cdot Y_R \quad (5)$$

$$Z_G = \frac{1 - x_g - y_g}{y_g} \cdot Y_G \quad (6)$$

$$Z_B = \frac{1 - x_b - y_b}{y_b} \cdot Y_B \quad (7)$$

$$X_W = X_R + X_G + X_B \quad (8)$$

$$Y_W = Y_R + Y_G + Y_B \quad (9)$$

$$Z_W = Z_R + Z_G + Z_B \quad (10)$$

$$x_w = \frac{X_W}{X_W + Y_W + Z_W} \quad (11)$$

$$y_w = \frac{Y_W}{X_W + Y_W + Z_W} \quad (12)$$

Therefore, if the numerical values $(x_r, y_r)$, $(x_g, y_g)$, $(x_b, y_b)$ stored in the nonvolatile memory 7 are read by the system controller 6 in response to the input numerical values $(x_w, y_w)$ and $y_w$, calculations are executed to solve simultaneous equations of Eq. (9) and those obtained by substituting Eqs. (2) through (7) for Eqs. (8) and (10) and further for Eqs. (11) and (12). Then the luminances $Y_R$, $Y_G$, $Y_B$ of the individual fluorescers are calculated to produce a monitor output representative of the specified color temperature $(x_w, y_w)$ and luminance $y_w$.

After calculation of the luminances $Y_R$, $Y_G$, $Y_B$ of the fluorescers, the cathode currents $I_{K(R)}$, $I_{K(G)}$, $I_{K(B)}$ are calculated from the aforementioned $(Y = K \times (I_K)^\gamma)$ in Eq. (1) [F102].

The values $\gamma_R$, $\gamma_G$, $\gamma_B$, $K_R$, $K_G$, $K_B$ stored in the nonvolatile memory are read out therefrom and are substituted for Eq. (1) together with the luminances $Y_R$, $Y_G$, $Y_B$ of the individual fluorescers as follows:

$$I_{K(R)} = \left(\frac{Y_R}{K_R}\right)^{1/\gamma_R}$$

$$I_{K(G)} = \left(\frac{Y_G}{K_G}\right)^{1/\gamma_G}$$

$$I_{K(B)} = \left(\frac{Y_B}{K_B}\right)^{1/\gamma_B}$$

Thus, there can be obtained the cathode currents $I_{K(R)}$, $I_{K(G)}$, $I_{K(B)}$ of the R, G, B electron guns corresponding to the input color temperature $(x_w, y_w)$ and luminance $Y_w$.

Since the actual measured cathode currents are supplied via the A-D converters 5R, 5G, 5B to the system controller 6, such measured cathode currents are compared with the calculated cathode currents, and gain control signals or bias control signals are supplied via D-A converters 12R, 12G, 12B to the CRT drive circuit 4 so as to render the measured values coincident with the calculated values [F103, F104, F105]. The control signals are supplied continuously until a coincidence is attained between the measured values and the calculated values, and the operation of controlling the drive circuit 4 is completed at the instant of such coincidence or when the desired color temperature and luminance have been attained.

As described above, if the desired color temperature and luminance specified by numerical values are inputted in this embodiment, the specified CRT output can be obtained automatically due to the operation of the system controller 6. Accordingly, control of the white balance is achievable by inputting predetermined color temperatures at high and low luminances alternately with execution of the cathode current control as in the procedure of FIG. 2. The operation of the system controller 6 for controlling the white balance is performed in conformity to the procedure shown in a flow chart of FIG. 3.

First, when numerical values representing a luminance $Y_{W(H)}$ of 100% white and a luminance $Y_{W(L)}$ of 20% white for example are inputted from the keyboard 8 or the like together with color temperature data $(x_w, y_w)$ [F200], then the luminance $Y_{R(H)}$, $Y_{G(H)}$, $Y_{B(H)}$ of the fluorescers corresponding to the input 100%-white luminance and the luminance $Y_{R(L)}$, $Y_{G(L)}$, $Y_{B(L)}$ corresponding to the input 20%-white luminance are calculated from the color temperature data $(x_w, y_w)$ according to Eqs. (2) through (12) [F201]. Subsequently, cathode currents $I_{K(R \cdot H)}$, $I_{K(G \cdot H)}$, $I_{K(B \cdot H)}$ and $I_{K(R \cdot L)}$, $I_{K(G \cdot L)}$, $I_{K(B·L)}$ corresponding to the above are calculated according to Eq. (1) [F202].

Upon termination of calculating the cathode currents, bias control for the R, G, B driving signals is executed in the CRT drive circuit 4 in such a manner that the cathode currents $I_{K(R·L)}$, $I_{K(G·L)}$, $I_{K(B·L)}$ at the 20%-white luminance become equal to the measured cathode currents [F203, F204].

Figure 5A:
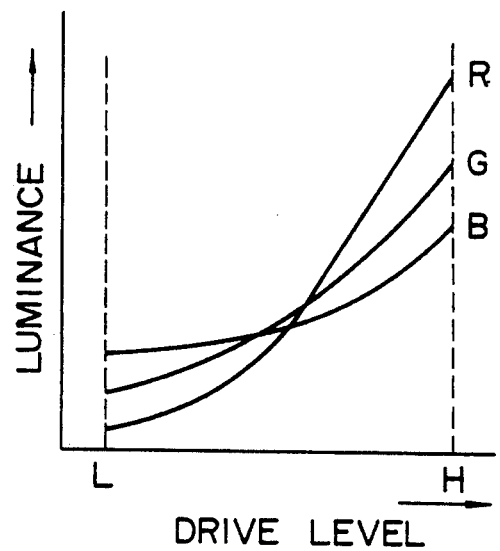
FIGS. 5A through 5C graphically show how the white balance control operation is performed.
Figure 5B:
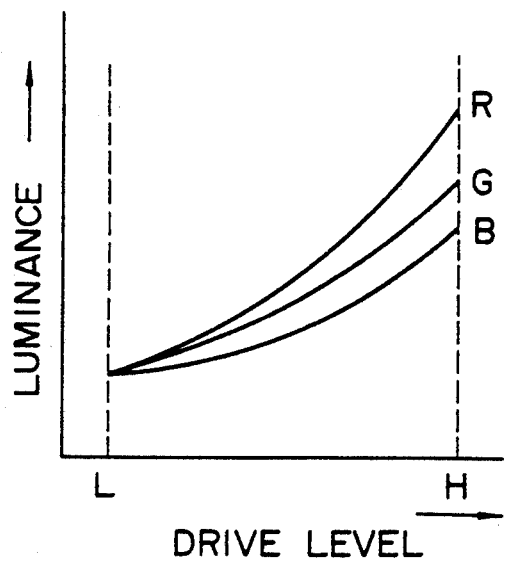

After completion of the adjustment to the state of FIG. 5B posterior to termination of the bias control, a decision is made as to whether the cathode currents $I_{K(R·H)}$, $I_{K(G·H)}$, $I_{K(B·H)}$ at the 100%-white luminance are coincident with the measured cathode currents [F205], and if the result of such decision is negative, gain control is executed to attain a coincidence therebetween [F206, F207].

Since the gain control affects the characteristic in the low luminance area, another decision is made as to whether the cathode currents at the 20%-white luminance is coincident with the calculated values, and if the result of such decision is negative, the bias control is executed again to attain a coincidence therebetween [F208].

Furthermore, since the bias control also affects the characteristic in the high luminance area, the gain control is executed again, if necessary, after termination of the bias control.

Figure 5C:
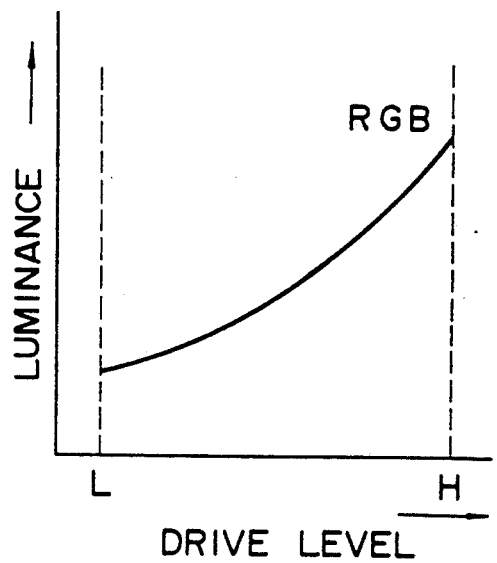

Thus, the bias control and the gain control are executed alternately until finally achieving the characteristic shown in FIG. 5C, and then the white balance control is completed.

Due to the operation described above, it becomes possible in this embodiment to perform an automatic white balance control without the necessity of using any optical sensor.

Figure 4:
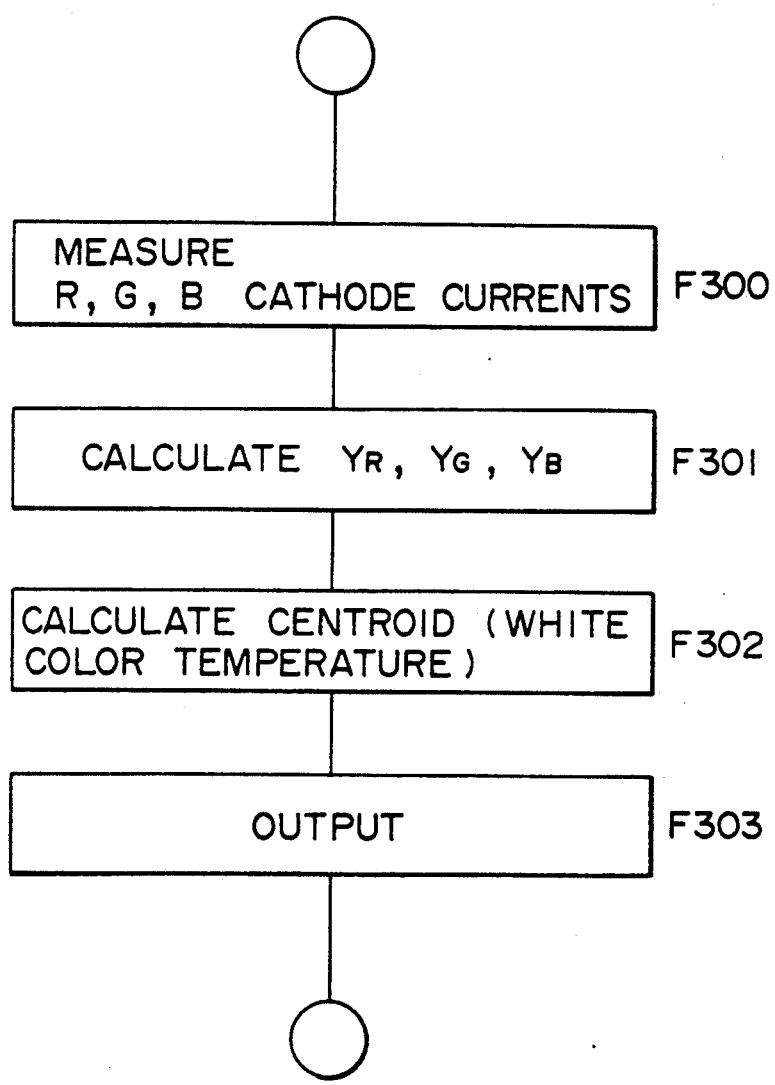
FIG. 4 is a flow chart showing the procedure of a calculated data output operation of the system controller in the embodiment.

This embodiment is further equipped with another function of calculating numerical values of the color temperature and the luminance from the measured cathode currents and outputting such values. More specifically, the color temperature being displayed as a CRT output can be measured without using any expensive optical sensor or a spectrum analyzer. The operation of the system controller 6 contrived to realize such measurement is shown in a flow chart of FIG. 4.

In response to cathode currents $I_{K(R)}$, $I_{K(G)}$, $I_{K(B)}$ inputted via the A-D converters 5R, 5G, 5B, the luminances $Y_R$, $Y_G$, $Y_B$ of the fluorescers can be calculated by substituting the received values for Eq. (1) together with the coefficients $\gamma_R$, $\gamma_G$, $\gamma$hd B, $K_R$, $K_G$, $K_B$ stored in the nonvolatile memory 7 [F300, F301]. Further the centroid of the three fluorescers, i.e., the three stimulus values $X_W$, $Y_W$, $Z_W$ of the desired color temperature, can be obtained by substituting the calculated luminances $Y_R$, $Y_G$, $Y_B$ of the fluorescers for the luminances in Eqs. (2) through (7) together with the numerical values representative of the chromaticity points $(x_r, y_r)$, $(x_g, y_g)$, $(x_b, y_b)$, and further substituting the results of the above calculations for Eqs. (8) through (10). Therefore, the color temperature can be calculated by substituting the above with the values in Eqs. (11) and (12) [F302].

The data of the color temperature $(x_w, y_w)$ and the luminance $(Y_w)$ thus calculated are displayed on the control monitor 10 or are supplied from the output port 11 to an external apparatus [F303].

The above operation enables the user to grasp the color temperature, which is being displayed on the CRT, with the numerical values displayed on the control monitor 10. Consequently, if the user controls the chromaticity or the white balance by manipulating the rheostat, the controlled amount can be grasped in the form of a numerical value. It is therefore suited for readjustment or indication of the controlled value relative to any other television receiver.

Figure 2:
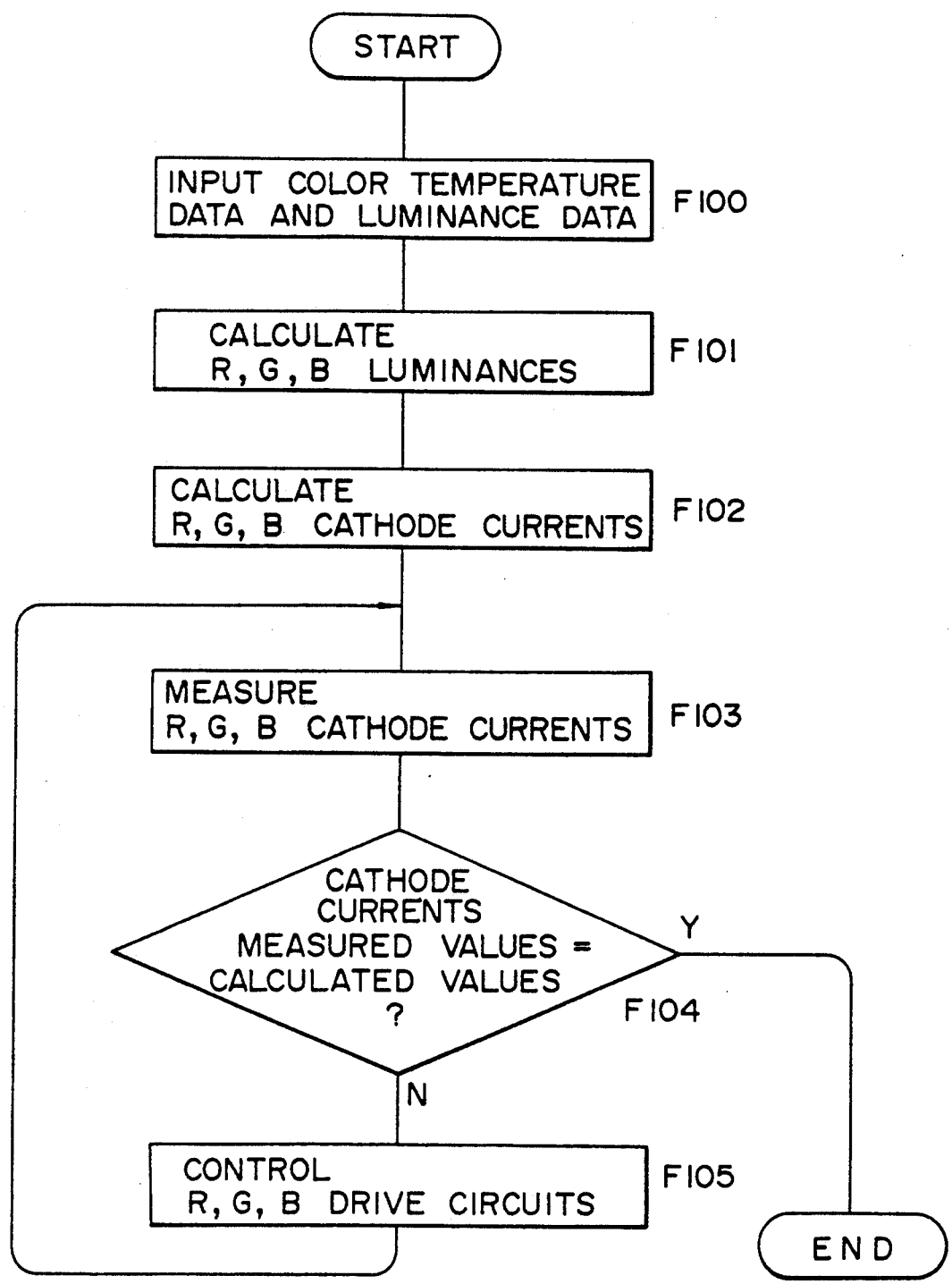
FIG. 2 is a flow chart showing the procedure of a CRT output control operation of a system controller in the embodiment of the present invention.
Figure 3:
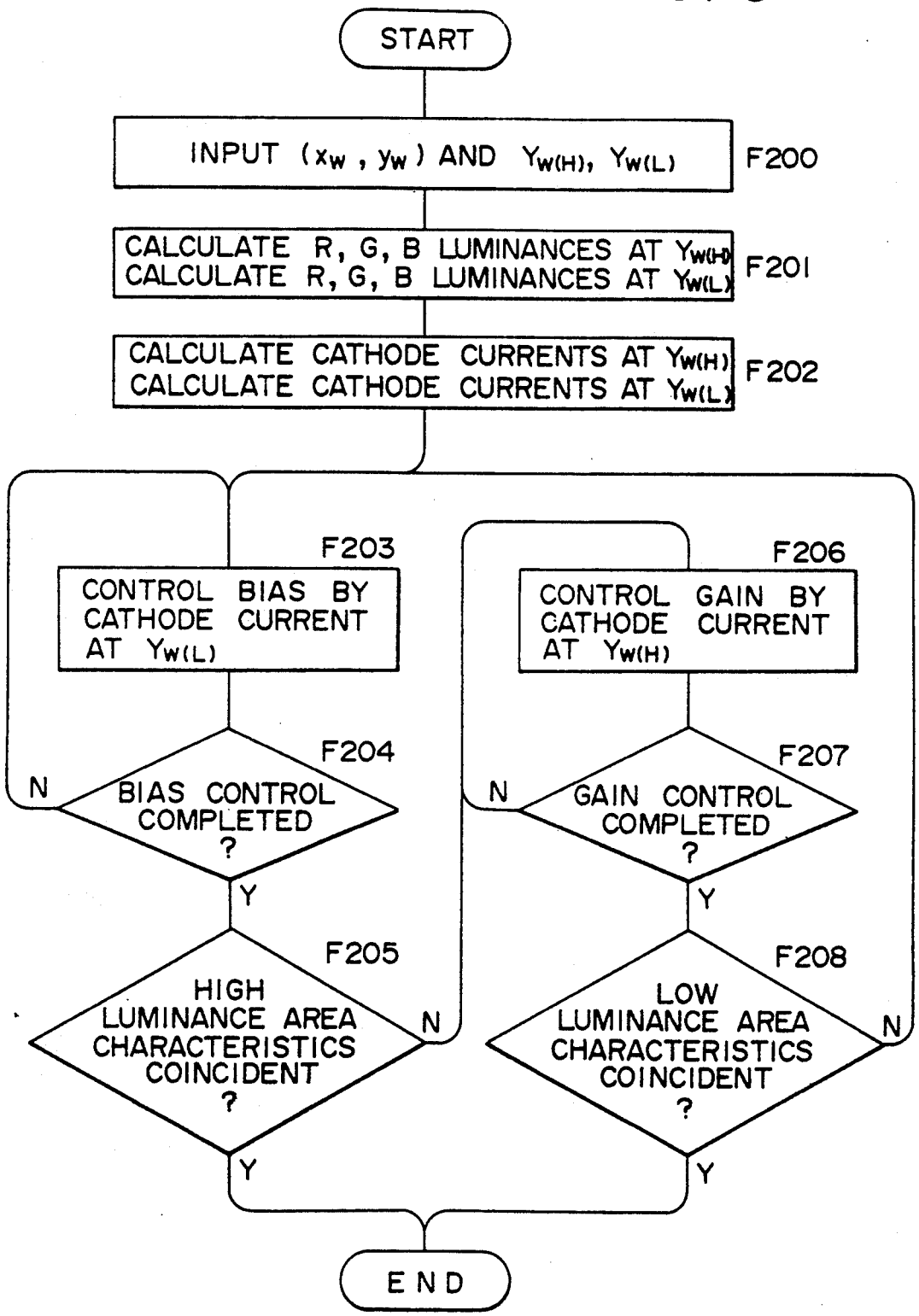
FIG. 3 is a flow chart showing the procedure of a white balance control operation of the system controller in the embodiment.

In the case where a plurality of the monitor television receivers of the present invention are mutually connected via output ports 11, if it is required to adjust the states of the entire monitor television receivers to the color temperature or white balance in one reference receiver, such adjustment is automatically achievable by supplying the color temperature data or the luminance data from the output port 11 of the reference monitor television receiver to the input ports 9 of the other receivers and executing the operating procedure shown in FIGS. 2 and 3. Thus, the entire monitor television receivers can be automatically set in the same controlled state to consequently ensure remarkable advantages particularly in a monitor room of a broadcasting station or in a multi-CRT display system.

According to the monitor television receiver of the present invention, as described hereinabove, the CRT drive circuit is so controlled as to render the measured cathode currents coincident with the cathode currents calculated on the basis of the specified color temperature and luminance. Therefore, the desired color temperature and luminance inputted in the form of numerical values are outputted automatically from the CRT, whereby the white balance control conforming with the desired color temperature can be automatically executed as well. Furthermore, control of the white balance and measurement of the color temperature or luminance being outputted are achievable easily and accurately without the necessity of employing any expensive optical sensor. In addition, any error that may otherwise be derived from external light is not caused at all due to the non-use of an optical sensor. Besides the above, in a monitor system including a plurality of such monitor television receivers connected to one another, the entire receivers can be automatically set in the same state with regard to both the color temperature and the white balance, hence attaining a variety of remarkably superior advantages and effects.

What is claimed is:

1. Apparatus for displaying or supplying a video output, comprising:

a color television monitor including a cathode ray tube;

current measuring means for measuring the cathode currents of electron guns for three primary colors in said cathode-ray tube;

memory means for storing at least coefficients to form functional expressions relative to the cathode currents and the luminances in said color television monitor, and also storing chromaticity points of three-color fluorescers therein;

input means for receiving arbitrary color temperature data and luminance data from external sources;

arithmetic means for calculating, in accordance with the luminance data and the color temperature data obtained from said input means and also with the chromaticity points of said three-color fluorescers stored previously in said memory means, the luminances of said three-color fluorescers corresponding to the input luminance data and color temperature data and for calculating, in accordance with the luminances of said three-color fluorescers and the coefficients stored in said memory means, the cathode currents of said three-color electron guns corresponding to the color temperature data and the luminance data obtained from said input means; and control means for controlling a CRT drive circuit in such a manner that the cathode currents measured by said current measuring means are rendered coincident with the cathode currents calculated by said arithmetic means;

whereby white balance can be achieved without the aid of an optical sensor.

2. For use in a television broadcasting studio, the combination of:

at least two monitor television receivers each including a cathode ray tube for displaying or supplying a color video output, at least a first of said receivers comprising:

current measuring means for measuring the cathode currents of electron guns for three primary colors in a cathode-ray tube;

memory means for storing at least coefficients to form functional expressions relative to the cathode currents and the luminances in said monitor television receiver, and also storing chromaticity points of three-color fluorescers therein;

arithmetic means for calculating the luminances of said three-color fluorescers in accordance with the cathode currents measured by said current measuring means and also with the coefficients stored in said memory means and for calculating the color temperature corresponding to the measured cathode currents in accordance with both the luminances of said three-color fluorescers and the chromaticity points thereof stored in said memory means; and output means for outputting the color temperature data calculated by said arithmetic means; and at least a second of said receivers comprising input means connected to said output means for inputting the color temperature data calculated by said arithmetic means of said first of said receivers, whereby both of said receivers can be automatically set in the same state with regard to color temperature.

* * * * *